United States Patent
Kolosowski

[11] Patent Number: 5,228,384
[45] Date of Patent: Jul. 20, 1993

[54] DOUBLE BOILER CONTAINER

[76] Inventor: Jadwiga M. Kolosowski, 1411 Falcon Dr., Troy, Mich. 48098

[21] Appl. No.: 982,908

[22] Filed: Nov. 30, 1992

[51] Int. Cl.⁵ .................. A47J 27/00; A47J 27/10; A47J 27/21; F24D 1/00
[52] U.S. Cl. ............................. 99/342; 99/403; 99/472; 126/369; 126/377; 126/388; 126/389; 220/408; 220/428; 220/912
[58] Field of Search .............. 99/403, 410, 413–417, 99/450, 342, 285, 472; 126/369, 377, 388, 389; 220/408, 428, 912, 433, 446, 411–413

[56] References Cited

U.S. PATENT DOCUMENTS

| | | | |
|---|---|---|---|
| 51,208 | 11/1865 | Neynaber | 126/377 |
| 120,995 | 11/1871 | O'Sullivan | 220/428 |
| 241,301 | 5/1881 | Clarkson | 126/369 |
| 525,933 | 9/1894 | Wood | 126/377 |
| 2,255,134 | 9/1941 | Thomas | 220/428 |
| 3,125,946 | 3/1964 | Falla | 99/342 |
| 3,641,992 | 2/1972 | Peyser et al. | 220/428 |
| 4,010,736 | 3/1977 | Sacomani et al. | 126/369 |
| 4,331,127 | 5/1982 | Grosso | 126/389 |
| 4,823,980 | 4/1989 | Ejiri | 220/408 |
| 4,838,244 | 6/1989 | Giles, Sr. et al. | 99/403 |

FOREIGN PATENT DOCUMENTS

| | | | |
|---|---|---|---|
| 861443 | 2/1941 | France | 99/417 |
| 1108072 | 1/1956 | France | 220/428 |

*Primary Examiner*—Timothy F. Simone
*Attorney, Agent, or Firm*—Leon Gilden

[57] ABSTRACT

A double boiler container includes an interior wall spaced from an exterior wall having a fluid chamber therebetween accessed through a fill conduit through the outer side wall, with the fill conduit including a vent port. A modification of the invention includes the vent port arranged to include pressure relief structure positioned therewithin.

4 Claims, 4 Drawing Sheets

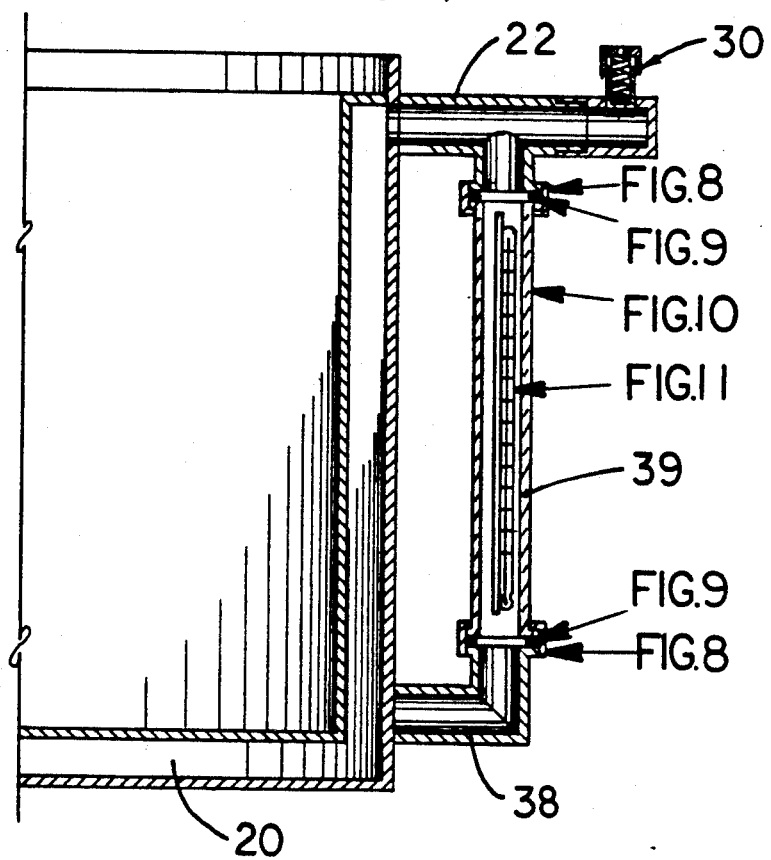
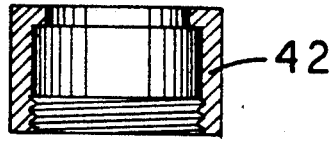
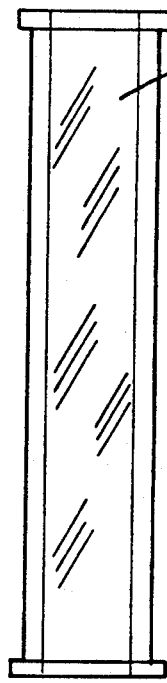
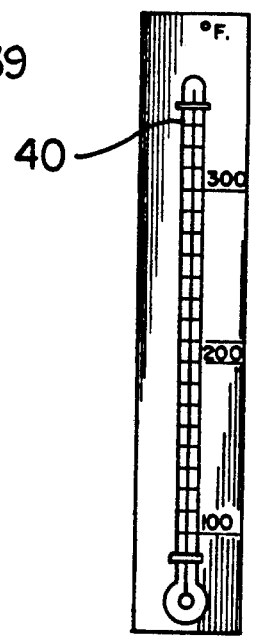
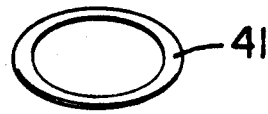

DOUBLE BOILER CONTAINER

BACKGROUND OF THE INVENTION

1. Field of the Invention

The field of invention relates to double boiler construction, and more particularly pertains to a new and improved double boiler container wherein the same is arranged for the position of an interface boiler chamber between the exterior wall and the interior wall of the associated container structure.

2. Description of the Prior Art

Double boilers of various types have been utilized in the prior art for employment of a boiler chamber to prevent burning and provide for a more continuous and even cooking of food components within the inner chamber. Such apparatus is exemplified in U.S. Pat. No. 3,641,992.

The instant invention attempts to overcome deficiencies of the prior art by providing a double boiler chamber arranged for the ease of replenishment of the fluid within the chamber, as well as the provision of a vent structure therefore and in this respect, the present invention substantially fulfills this need.

SUMMARY OF THE INVENTION

In view of the foregoing disadvantages inherent in the known types of double boiler containers now present in the prior art, the present invention provides a double boiler container wherein the same includes filling and venting conduit structure directed through the outer wall in communication with the chamber of the invention. As such, the general purpose of the present invention, which will be described subsequently in greater detail, is to provide a new and improved double boiler container which has all the advantages of the prior art double boiler containers and none of the disadvantages.

To attain this, the present invention provides a doubler boiler container including an interior wall spaced from an exterior wall having a fluid chamber therebetween accessed through a fill conduit through the outer side wall, with the fill conduit including a vent port. A modification of the invention includes the vent port arranged to include pressure relief structure positioned therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved double boiler container which has all the advantages of the prior art double boiler containers and none of the disadvantages.

It is another object of the present invention to provide a new and improved double boiler container which may be easily and efficiently manufactured and marketed.

It is a further object of the present invention to provide a new and improved double boiler container which is of a durable and reliable construction.

An even further object of the present invention is to provide a new and improved double boiler container which is susceptible of a low cost of manufacture with regard to both materials and labor, and which accordingly is then susceptible of low prices of sale to the consuming public, thereby making such double boiler containers economically available to the buying public.

Still yet another object of the present invention is to provide a new and improved double boiler container which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic cross-sectional illustration of the container structure employing a transparent sight tube positioned in a parallel relationship relative to the chamber.

FIG. 8 is an orthographic cross-sectional illustration of section 8 as indicated in FIG. 7.

FIG. 9 is an isometric illustration of the section 9 as set forth in FIG. 7.

FIG. 10 is an orthographic view of section 10 as set forth in FIG. 7.

FIG. 11 is an orthographic view of section 11 as set forth in FIG. 7.

DESCRIPTION OF THE PREFERRED EMBODIMENT

Figure 1:
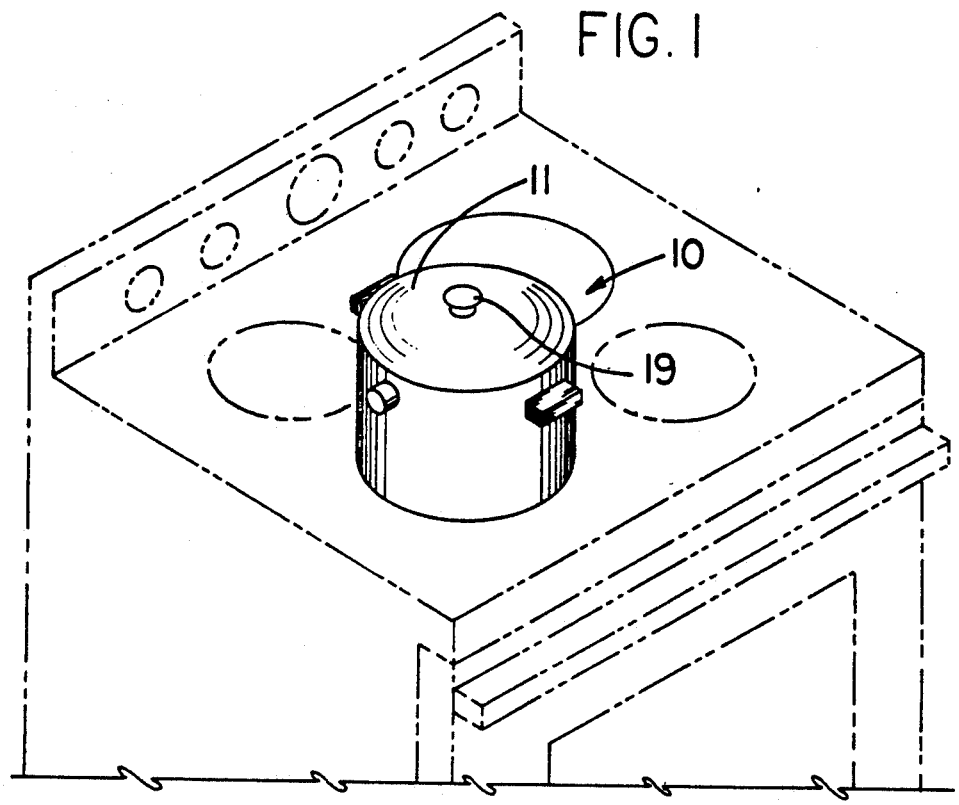
FIG. 1 is an isometric illustration of the instant invention in use.
Figure 2:
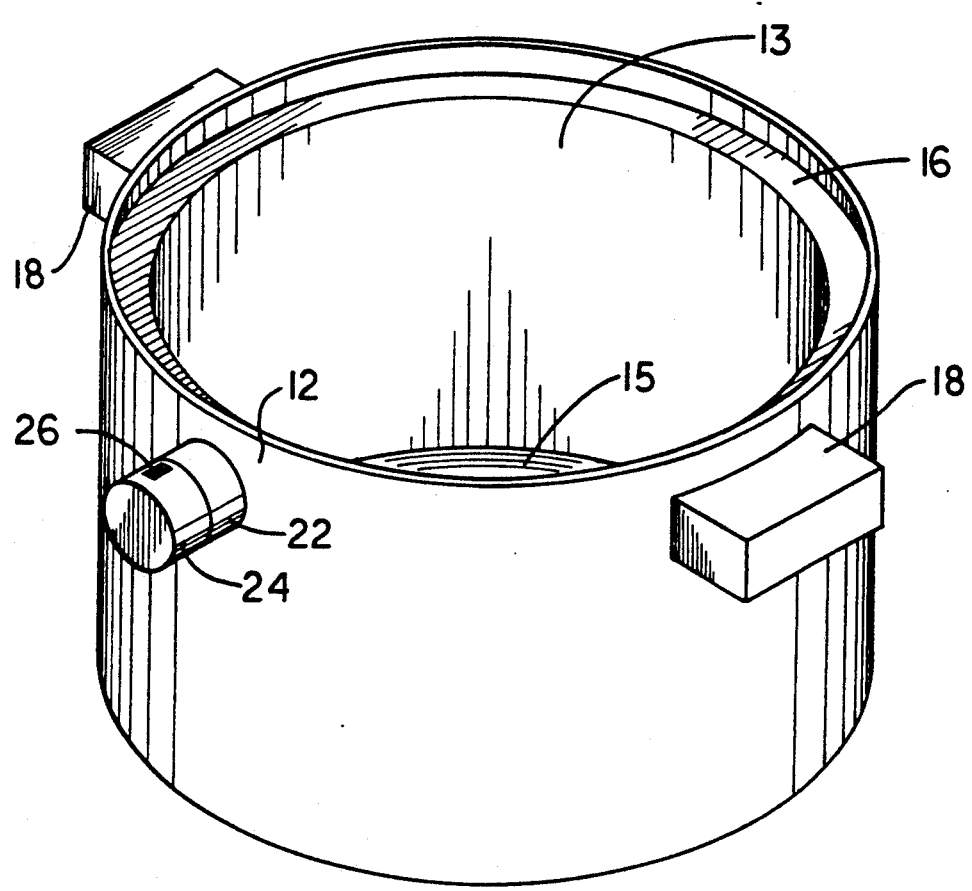
FIG. 2 is an isometric illustration of the container structure of the invention.

With reference now to the drawings, and in particular to FIGS. 1 to 11 thereof, a new and improved doubled boiler container embodying the principles and concepts of the present invention and generally designated by the reference numeral 10 will be described.

More specifically, the double boiler container 10 of the instant invention essentially comprises a container structure including a container lid 11 arranged for mounting thereon. The container includes an outer wall 12 spaced from an inner wall 13, with the outer wall having an outer wall floor 14, the inner wall having an inner wall 15. A container annular flange 16 is directed from the outer wall 12 to the inner wall 13 defining a fluid chamber 20 therewithin the outer wall, inner wall, inner floor, outer floor, and the annular flange. The container includes container handles 18 diametrically disposed relative to one another on opposite sides of the container, with the lid including a lid handle 19.

Figure 3:
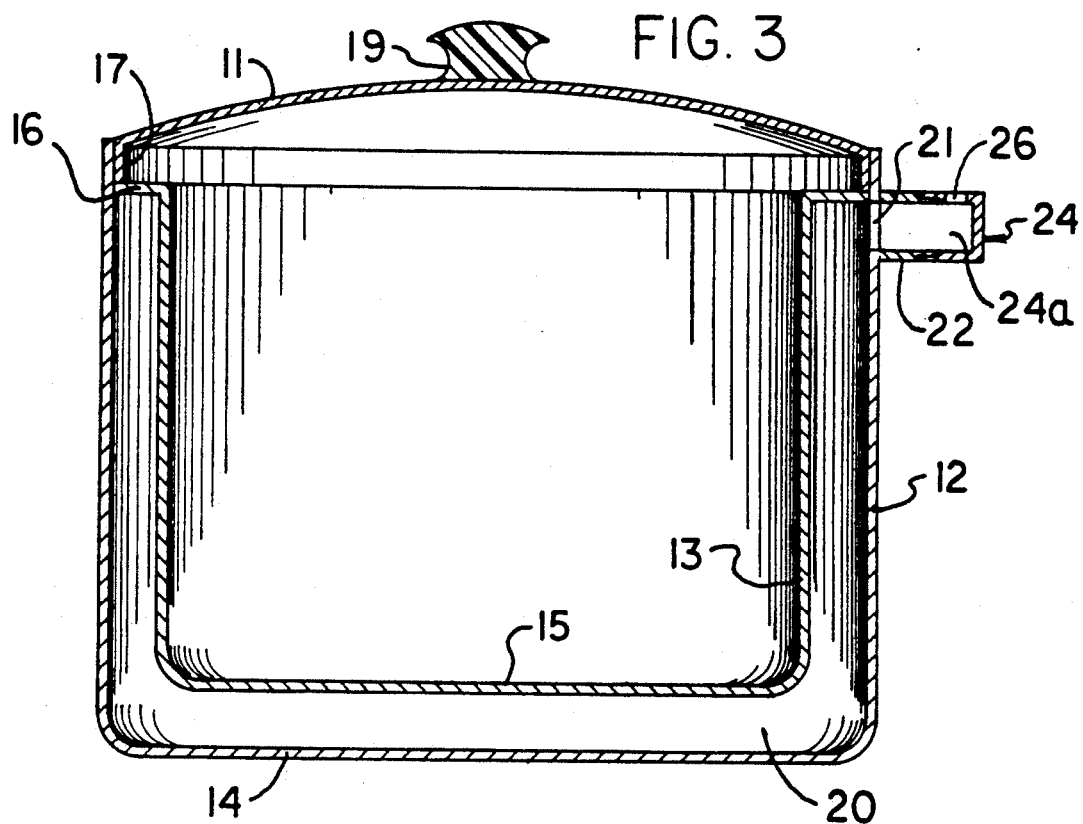
FIG. 3 is an orthographic cross-sectional illustration of the container structure in an assembled configuration.
Figure 4:
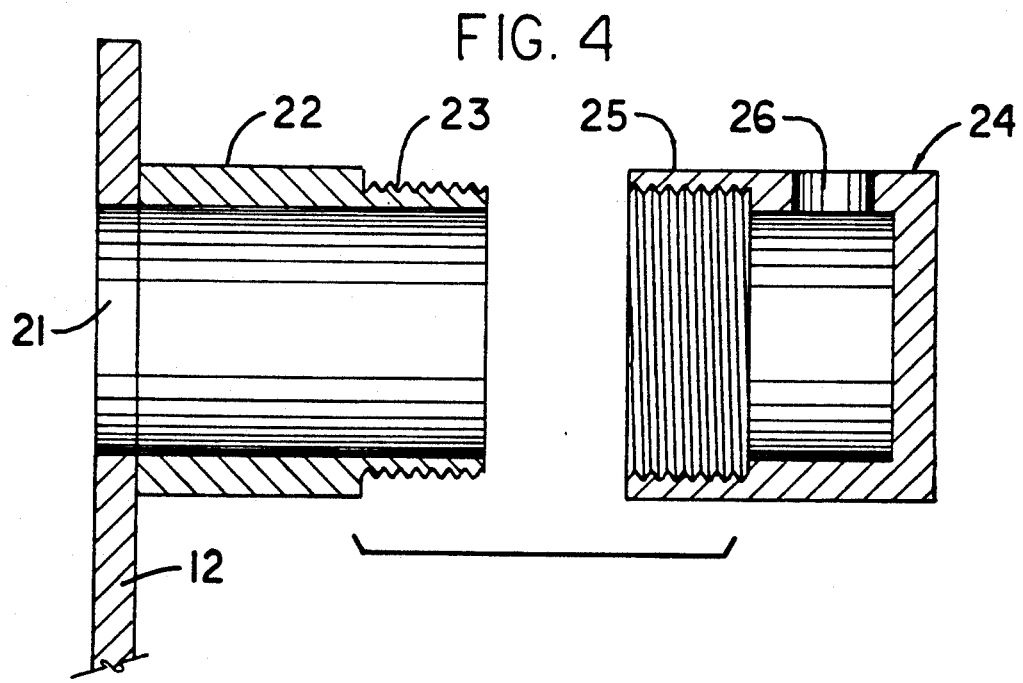
FIG. 4 is an orthographic cross-sectional illustration of the outer wall conduit and the associated conduit cap.

With reference to FIG. 3 indicates an outer wall opening 21 directed through the outer wall adjacent the annular flange 16 in communication with the fluid chamber 20. The outer wall opening 21 is directed through an outer wall conduit 22 having an externally threaded conduit portion 23. A conduit cap 24 24 having an internally threaded skirt 25 is arranged for securement about the conduit portion 23. The conduit cap 24 includes a conduit cavity 24a.

The outer wall conduit 22 permits replenishment of fluid within the fluid chamber 20 providing for selective replenishment and filling of the chamber 20, wherein the conduit cap 24 having a cap vent portion 26 permits venting of excessive pressure developed from steam generation within the chamber 20.

Figure 5:
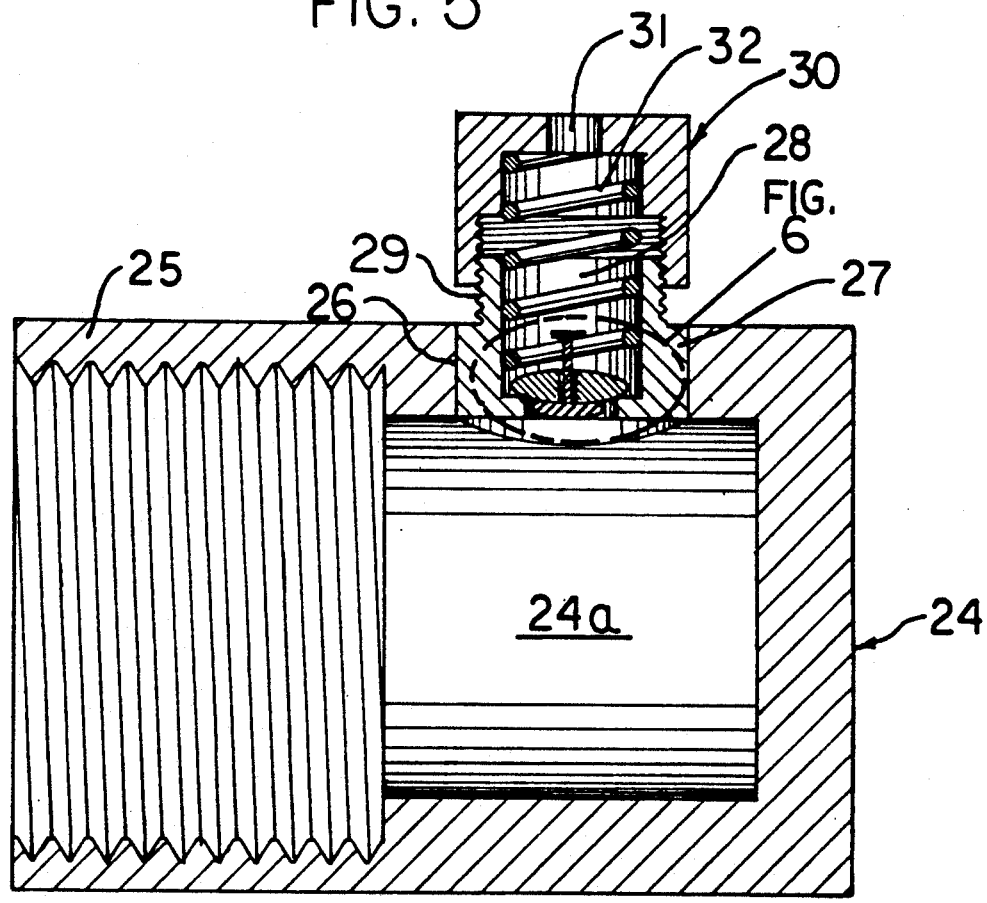
FIG. 5 is an enlarged isometric illustration of a modified cap structure of the invention.
Figure 6:
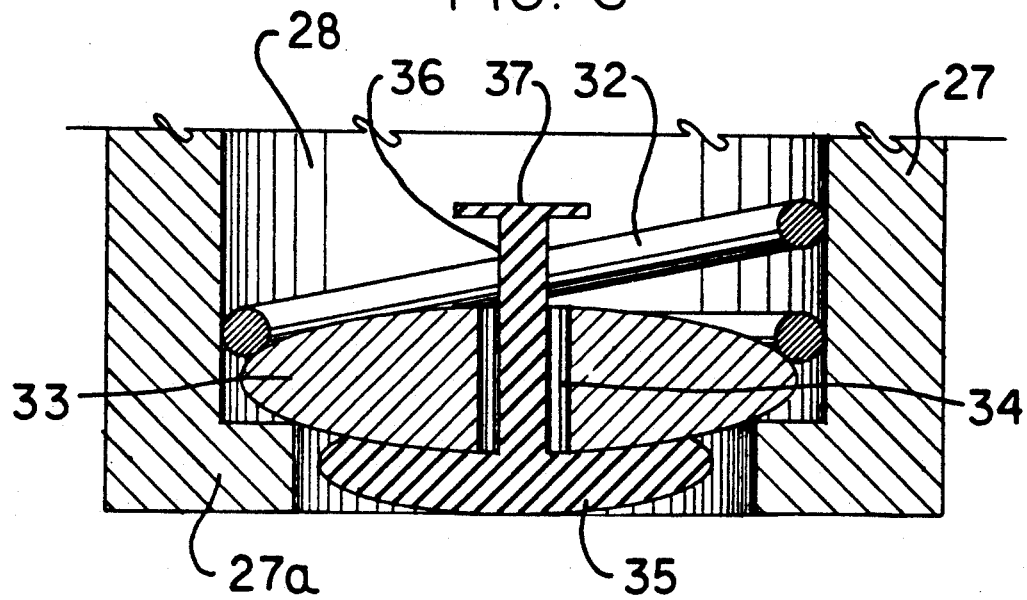
FIG. 6 is an enlarged orthographic view of section 6 as set forth in FIG. 5.

The FIG. 5 indicates the use of a cap structure 24 to further include a vent plug 27 directed into the cap end port 26. The vent plug 27 includes a vent plug conduit 28 and a vent plug threaded boss 29 extending from the vent plug 27 for threaded reception of an internally threaded vent cap 29. The vent cap 30 includes a vent cap port 31 directed through the vent cap in pneumatic communication with the vent plug conduit 28. A spring 32 is captured between the vent cap 30 and an annular floor flange 27a of the vent plug 27. At a lowermost end of the spring 32 is a pressure relief spring plug 33 mounted to the spring to overlie a lowermost opening of the vent plug 27, with a spring plug conduit 34 directed through the spring plug 33, having a vacuum sealing plug 35 arranged for spacing from the spring plug 33 upon vacuum formation within the chamber 20, such as during a cooling of the chamber 20. The vacuum sealing plug 30 has a plug rod 36 slidably received through the spring plug conduit 34, with a rod head 37 mounted on an opposite side of the spring plug 33 relative to the sealing plug 35 to limit displacement of the vacuum sealing plug 35 relative to the pressure relief spring plug 33.

The FIG. 7 indicates the use of a lower chamber conduit 38 spaced from and parallel the outer wall conduit 22, with a transparent sight tube 39 mounted between the outer wall conduit 22 and the lower chamber conduit 38, having a thermometer member 40 mounted upon the transparent sight tube 39. A conduit mounting cap 42 including an "O" ring 41 at each upper and lower end of the sight tube 39 provides for sealing of the sight tube 39 relative to the lower chamber conduit 38 and the outer wall conduit 22.

In this manner, water level as well as water level temperature within the chamber 20 is ascertainable.

As to the manner of usage and operation of the instant invention, the same should be apparent from the above disclosure, and accordingly no further discussion relative to the manner of usage and operation of the instant invention shall be provided.

With respect to the above description the, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A double boiler container, comprising,
    an outer wall spaced from an inner wall, the outer wall having an outer wall floor, the inner wall having an inner wall floor, and
    a container annular flange fixedly mounted between the outer wall and the inner wall, and
    a container lid, the container lid including a container lid flange, with the container lid flange arranged for reception upon the annular flange in adjacency to the outer wall, and
    the outer wall including an outer wall opening positioned in adjacency to the annular flange, and
    a fluid chamber oriented between the outer wall floor and the inner wall floor, and the outer wall and the annular flange, with the outer wall opening having an outer wall conduit fixedly mounted to the outer wall projecting beyond the outer wall, with the outer wall conduit having an externally threaded conduit portion, and a conduit cap arranged for mounting to the externally threaded conduit portion, the conduit cap including a conduit cap cavity, and having a cap vent port directed through the cap for effecting venting of the fluid chamber.

2. A container as set forth in claim 1 wherein the cap vent port includes a vent plug fixedly mounted within the vent port, the vent plug having a vent plug conduit directed therethrough, the vent plug having a vent plug floor and a vent plug floor opening, and the vent plug having a vent plug threaded boss projecting beyond the vent plug conduit, and a vent cap arranged for threaded securement to the threaded boss, and the vent cap having a vent cap port therethrough in pneumatic communication with the vent plug conduit, and a spring captured between the vent cap and the vent plug floor, the spring including a pressure relief spring plug mounted to a lower distal end of the spring in operative communication with the vent plug floor opening permitting displacement of the pressure relief spring plug from the vent plug floor upon excessive pressure being developed within the fluid chamber.

3. A container as set forth in claim 2 wherein the pressure relief spring plug includes a spring plug conduit directed therethrough, and a sealing plug, the sealing plug having a sealing plug rod slidably directed through the spring plug conduit, and the sealing plug positioned on a first side of the spring plug within the conduit cap cavity, and the sealing plug including a sealing plug rod head fixedly mounted to the sealing plug rod on an opposite side of the pressure relief spring plug permitting vacuum venting of the fluid chamber.

4. A container as set forth in claim 3 including a lower chamber conduit in communication with the fluid chamber positioned in adjacency to the outer wall floor, and the lower chamber conduit having a transparent sight tube in fluid communication between the lower chamber conduit and the outer wall conduit, and the transparent sight tube having a thermometer member mounted upon the transparent sight tube for indicating visual temperature within the fluid chamber.

* * * * *